J. W. FORD.
CABLE RING FORMING MACHINE.
APPLICATION FILED SEPT. 27, 1916.

1,239,583.

Patented Sept. 11, 1917.
5 SHEETS—SHEET 1.

Inventor
John W. Ford

J. W. FORD.
CABLE RING FORMING MACHINE.
APPLICATION FILED SEPT. 27, 1916.

1,239,583.

Patented Sept. 11, 1917.
5 SHEETS—SHEET 2.

Inventor
John W. Ford
By T. M. Cornwall, Atty.

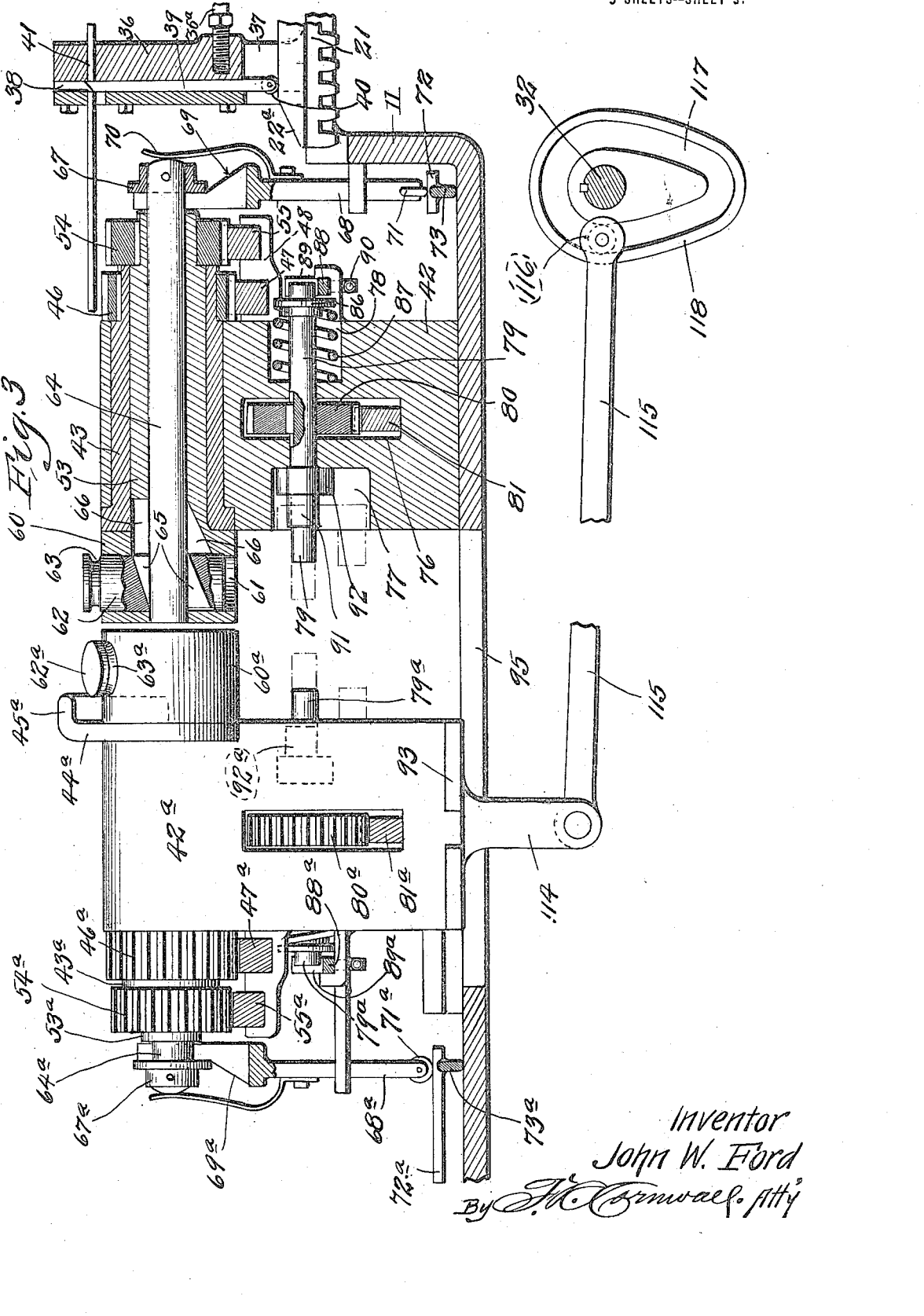

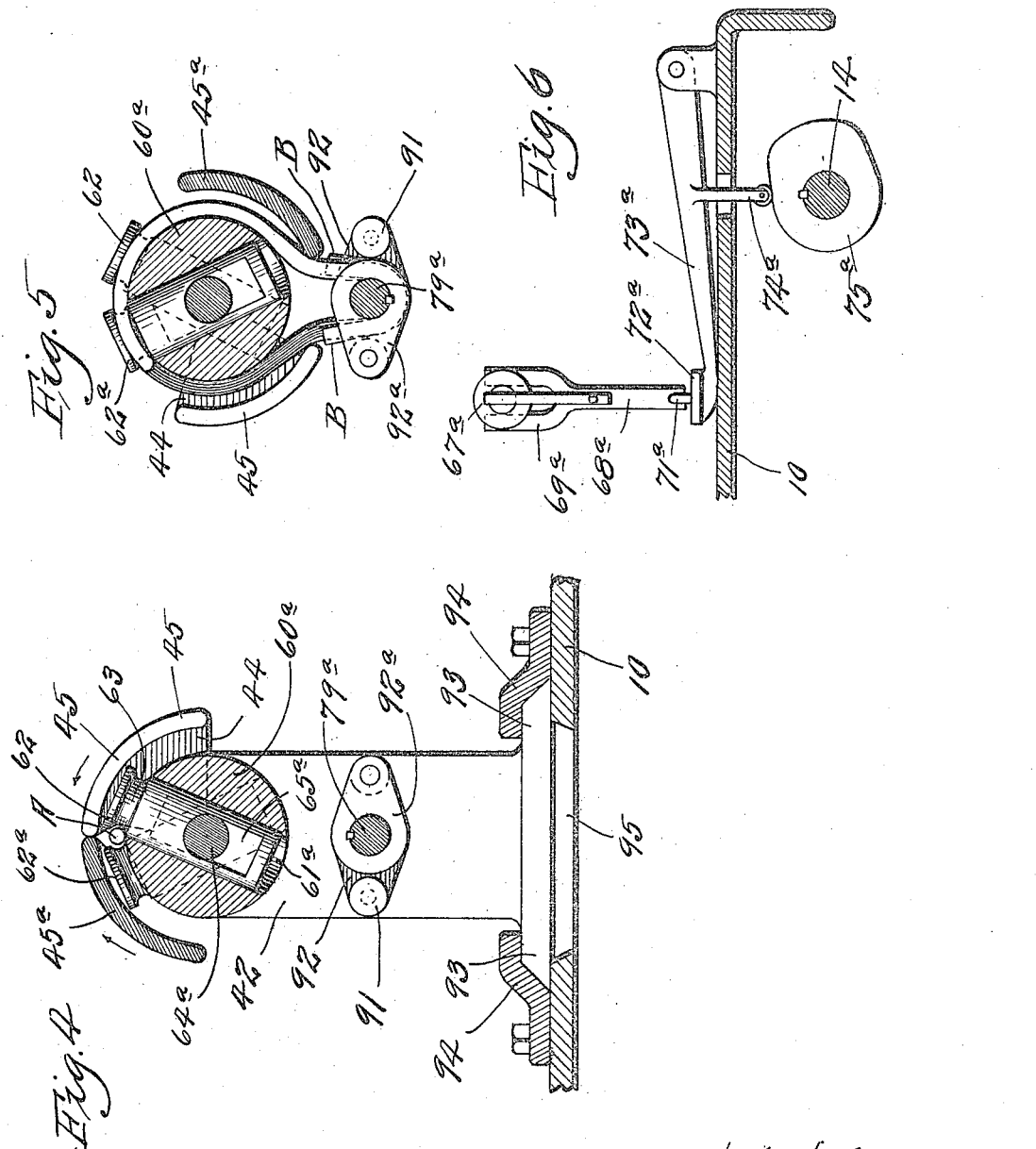

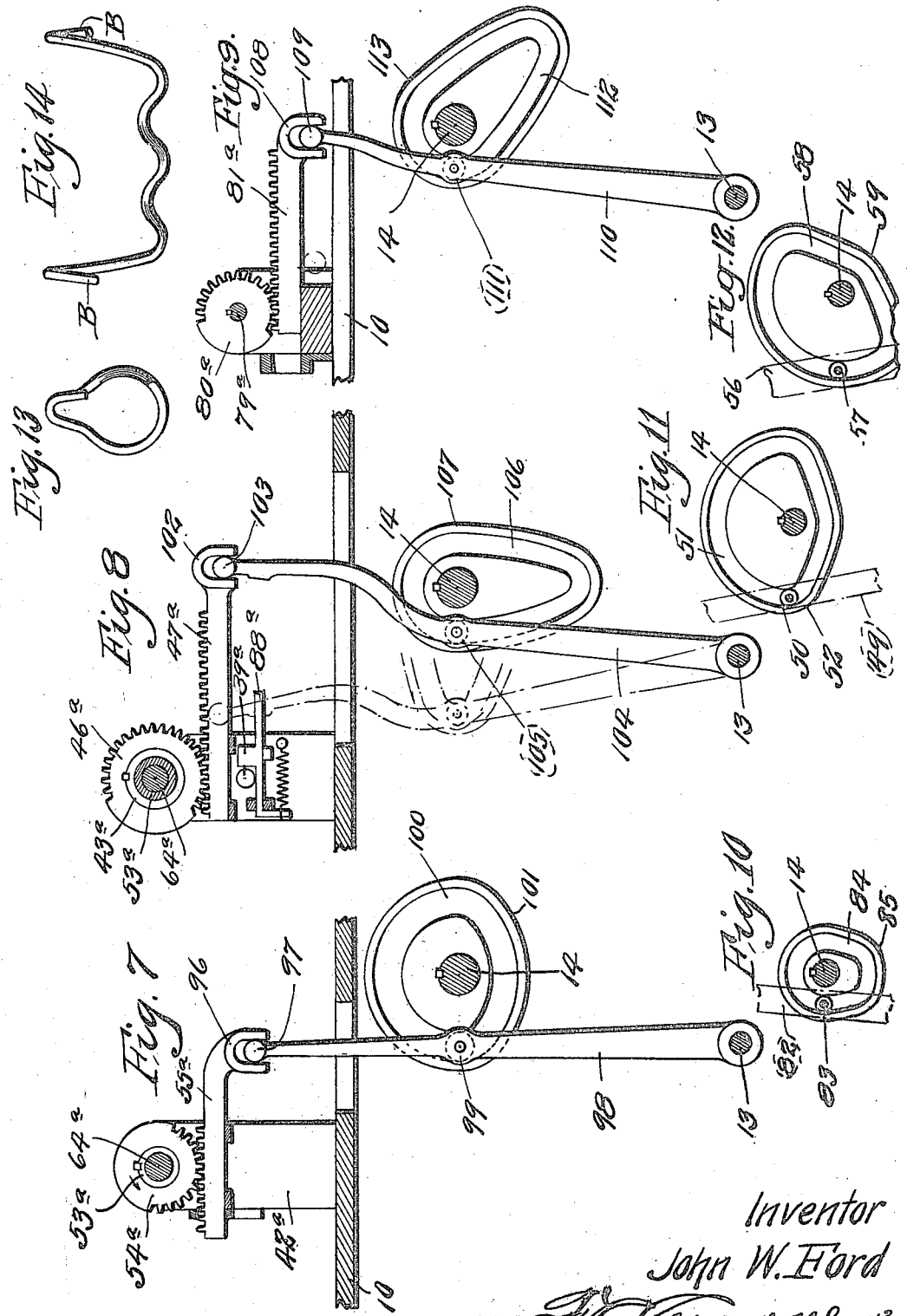

UNITED STATES PATENT OFFICE.

JOHN W. FORD, OF ST. LOUIS, MISSOURI, ASSIGNOR TO WILLIAM R. GILBERT, OF ST. LOUIS, MISSOURI.

CABLE-RING-FORMING MACHINE.

1,239,583.  Specification of Letters Patent.  Patented Sept. 11, 1917.

Application filed September 27, 1916. Serial No. 122,465.

*To all whom it may concern:*

Be it known that I, JOHN W. FORD, a citizen of the United States, residing at city of St. Louis, State of Missouri, have invented a certain new and useful Improvement in Cable-Ring-Forming Machines, of which the following is a full, clear, and exact description, such as will enable others skilled in the art to which it appertains to make and use the same, reference being had to the accompanying drawings, forming part of this specification.

My invention relates generally to wire working machinery and more particularly to a machine for forming cable rings or hangers from wire, the latter being automatically fed to the machine and cut off in sections of suitable length.

The principal objects of my invention are to provide a comparatively simple cable ring forming machine which is entirely automatic in operation; to provide a machine which can be operated at comparatively high speed so that the machine has a large capacity and consequently reducing the cost of production; and to provide a machine having a pair of mandrels or forming heads, one of which is adapted to move away from the other at the completion of the forming operation, thus permitting the completed ring or hanger to discharge from the machine by gravity.

With the foregoing and other objects in view, my invention consists in certain novel features of construction and arrangement of parts, hereinafter more fully described, claimed and illustrated in the accompanying drawings, in which—

Fig. 3 is an enlarged sectional view taken approximately on the line 3—3 of Fig. 1.

Fig. 4 is an enlarged cross section taken approximately on the line 4—4 of Fig. 1.

Fig. 5 is a cross-section similar to Fig. 4 and showing the forming means in the positions they occupy at the completion of the ring-forming operation.

Fig. 6 is an enlarged detail section taken approximately on the line 6—6 of Fig. 1.

Fig. 7 is an enlarged cross section taken approximately on the line 7—7 of Fig. 2.

Fig. 8 is an enlarged cross section taken approximately on the line 8—8 of Fig. 2.

Fig. 9 is an enlarged cross section taken approximately on the line 9—9 of Fig. 2.

Figs. 10, 11 and 12 are elevational views of cams utilized for imparting movement to certain operating parts of my improved machine.

Figs. 13 and 14 are, respectively, end and side elevational views of the type of cable ring or hanger which is formed by my improved machine.

Figure 1:
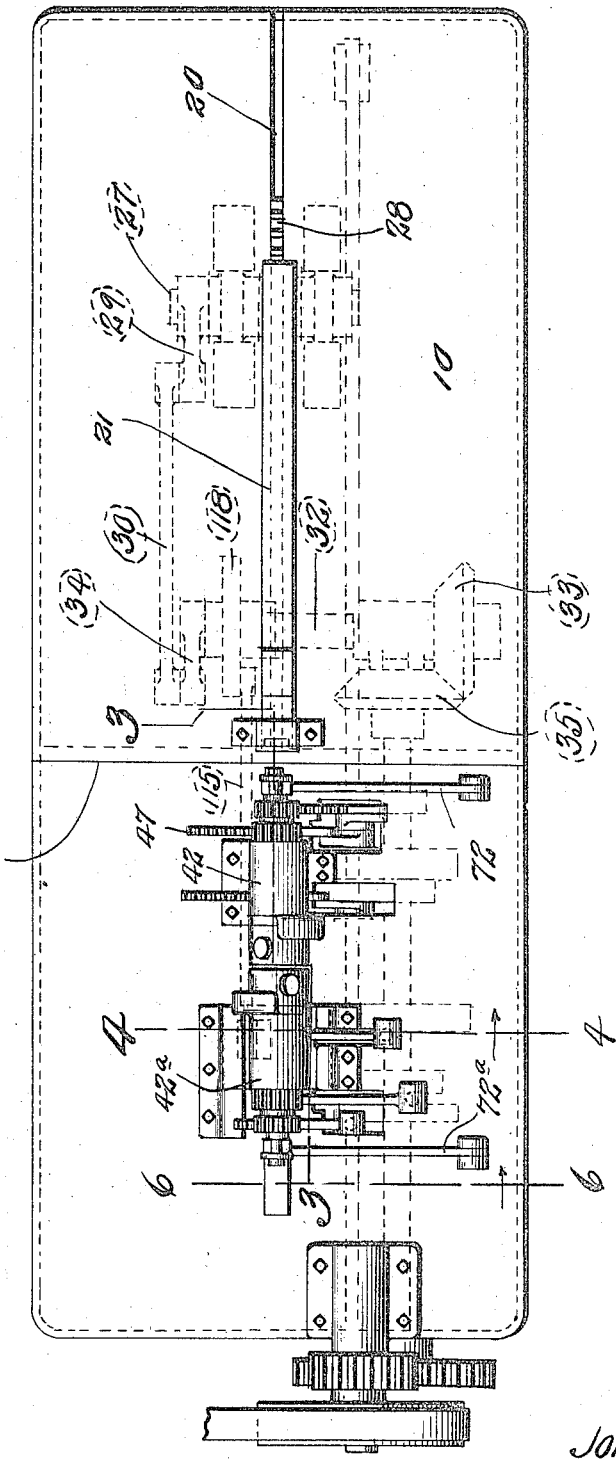
Figure 1 is a plan view of a cable ring forming machine of my improved construction.

Referring by numerals to the accompanying drawings, 10 designates the bed plate or table of my improved machine, the same being provided near its center with a vertically disposed offset 11, and thus the top of the right-hand portion of said bed plate occupies a plane slightly higher than that occupied by the left-hand portion. The bed plate thus constructed is supported, preferably at its ends, by suitable legs or vertically disposed frames 12, and supported by the latter a suitable distance below the bed plate is a longitudinally disposed shaft or rod 13 which serves as a bearing and support for a series of levers hereinafter more fully described.

Journaled in suitable bearings beneath the left-hand portion of the bed plate and above the shaft or rod 13 is a shaft 14, the same carrying a series of cams which impart movement to the levers carried by said shaft or rod 13, and fixed on the left-hand end of this shaft 14 is a gear wheel 15.

Journaled in a suitable bearing 16 which is fixed on top of the bed plate at the left-hand end thereof is a shaft 17 on which is fixed a pinion 18, the same meshing with gear wheel 15. Shaft 17 is driven in any suitable manner, preferably by means of a belt-driven pulley 19.

Formed in the center of the right-hand portion of bed plate 10 is a longitudinally disposed slot 20 and arranged for sliding movement lengthwise on top of said bed plate is a rack-bar 21 provided on its underside with teeth 22, which latter extend downward into slot 20. The left-hand end of this rack-bar is inclined or beveled as designated by 22ª, the purpose of such construction being hereinafter explained.

Carried by the rack-bar near its left-hand end is a short vertically disposed post 23, the upper end of which is provided with a laterally projecting lug 24.

Pivotally mounted on the side of the post directly beneath this lug 24 is a gravity pawl 25, the upper end of which is provided with a series of teeth which, when said pawl occupies a substantially vertical position, are adapted to grip the underside of a wire lying immediately beneath lug 24, and with the parts so positioned, the engaged wire will necessarily be fed or drawn forward as the rack-bar is moved toward the left hand over bed plate 10.

Depending from the right-hand portion of bed plate 10 and on opposite sides of the slot 20 are brackets 26 and journaled in the lower portions thereof is a shaft 27. Fixed on this shaft between the brackets 26 is a toothed quadrant 28, the teeth of which engage the teeth on the underside of rack-bar 21.

Fixed on one end of shaft 27 is a crank arm 29 to which is pivotally connected one end of a pitman 30. Journaled in suitable bearings 31 which depend from the bed plate at a point near the offset 11 is a transversely disposed shaft 32 on one end of which is fixed a beveled pinion 33, and carried by the other end of this shaft is a comparatively short crank arm 34 to which pitman 30 is pivotally connected.

Shaft 14 terminates at a point adjacent to shaft 32 and fixed on the end of said shaft 14 is a beveled pinion 35, which meshes with beveled pinion 33.

Fixed on bed plate 10 above the left-hand end of slot 20 is a post or upright 36, the lower portion of which is provided with an opening 37 for the accommodation of the rack-bar 21 when the latter is moved to the end of its forward stroke, and formed through said post or upright is a vertically disposed slot 38 in which is arranged for sliding movement a plate 39, the upper end of which is beveled to form a cutting edge. The lower end of this plate 39 is provided with an anti-friction roller 40 which is adapted to be engaged by the inclined or beveled face 22ª on the forward end of rack-bar 21.

Figure 2:
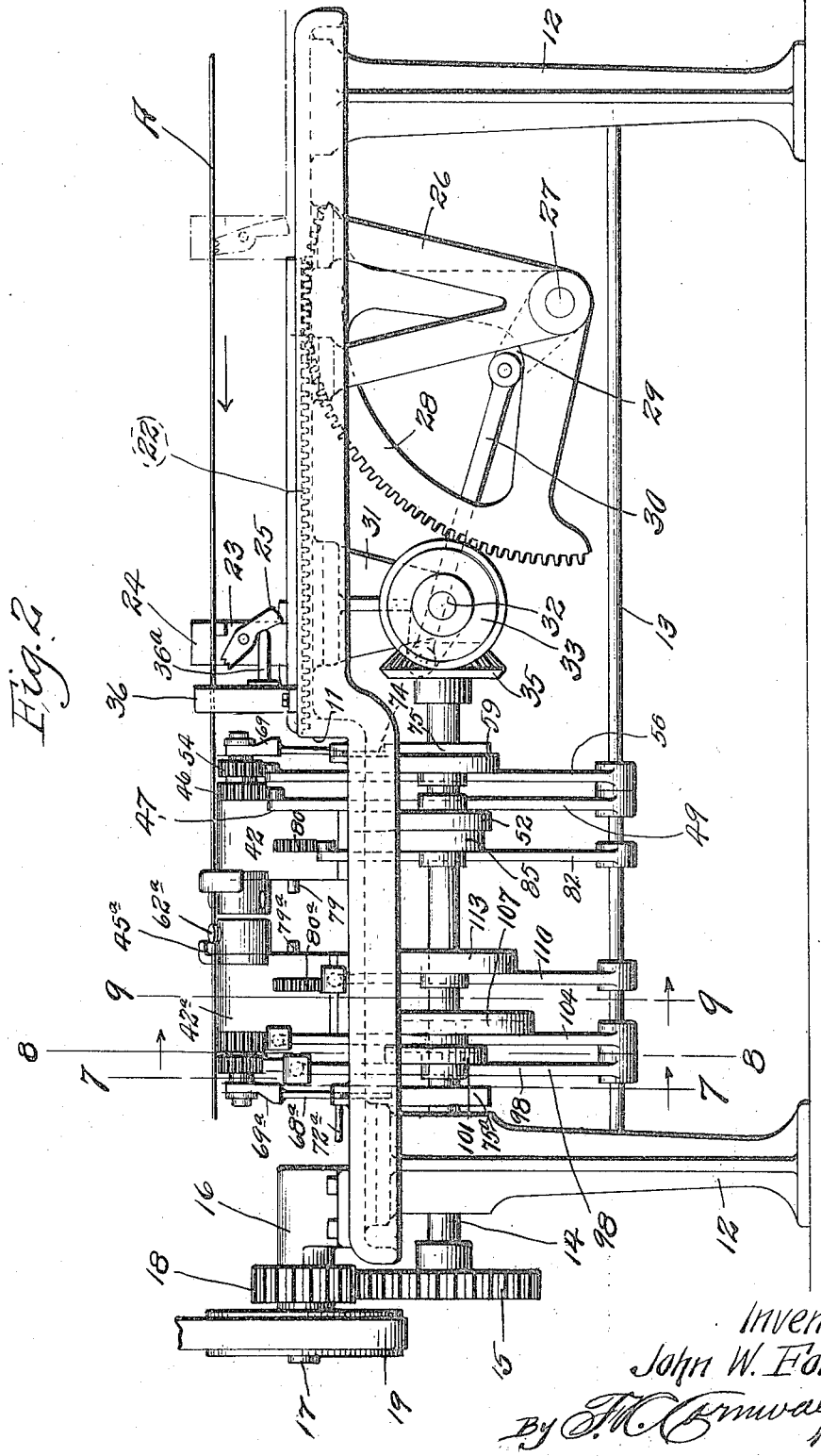
Fig. 2 is a front elevational view of the machine.

Adjustably seated in the lower rear portion of post 36 is a horizontally disposed pin 36ª which when rack bar 21 carrying the post 23 moves to its forward limit of movement engages the lower portion of pawl 25 and rocks the same so as to disengage the toothed upper end thereof from the wire which lies immediately beneath lug 24. (See Fig. 2.)

Formed through the upper portion of post or upright 36 is a horizontally disposed opening 41, the same intersecting the slot 38, and said opening being arranged so as to receive the wire A from which the cable rings are formed.

The mandrels or forming heads of my improved machine and their operating mechanism will now be described.

Fixed on the central portion of bed plate 10 immediately to the left of offset 11 is a block 42 in the upper portion of which is journaled for rotation a tubular shaft or sleeve 43, the forward end of which is provided with a laterally projecting segmental plate 44, and formed integral with the outer edge of the latter is a forwardly projecting curved forming plate 45.

Fixed on the rear end of sleeve 43 is a pinion 46, with which engage the teeth of a transversely disposed rack 47, the same being mounted for sliding movement upon a supporting bracket 48 which projects outwardly from the rear side of block 42. One end of this rack-bar 47 is pivotally connected to the upper end of an arm 49, the lower end thereof being loosely mounted on shaft 13. This arm 49 carries a roller 50 which engages in the eccentric groove 51 of a cam plate 52, the latter being fixed on shaft 14. The groove 51 is approximately of the contour illustrated in Fig. 11, and is intended to impart movement to arm 49 and sleeve 43 so as to intermittently shift the forming plate 45 from its normal position, as illustrated in Fig. 4, to the position illustrated in Fig. 5.

Mounted for rotary movement within sleeve 43 is a tubular shaft or sleeve 53 on the rear end of which is fixed a pinion 54. Meshing with the teeth of this pinion are the teeth of a transversely disposed rack-bar 55, the latter being mounted for sliding movement on bracket 48 adjacent to rack-bar 47, and one end of said rack-bar 55 is pivotally connected to the upper end of an arm 56, the lower end thereof being loosely mounted on shaft 13.

Carried by arm 56 is a roller 57 which latter occupies an eccentric groove 58 in a plate 59, and which latter is fixed on shaft 14. The forward end of sleeve 53 is provided with an integral head 60, and formed therethrough is a diametrically arranged aperture 61, in which is mounted for sliding movement a pin 62 and formed in the latter near the upper end is a peripheral groove 63.

Loosely mounted within sleeve 53 is a rod 64, the same extending through the head 60 and through the central portion of pin 62, and formed integral with or fixed to the forward end of this rod is a pair of oppositely disposed wedge-shaped lugs 65, which normally occupy corresponding recesses formed in pin 62. Portions of the sleeve 53 immediately adjacent the opening 61 are cut away as designated by 66 in order to accommodate these wedge-shaped members when the rod 64 is retracted to draw pin 62 into the aperture 61 within head 60.

Fixed on the rear end of rod 64 is a collar 67 and interposed between said collar and the end of sleeve 53 is the bifurcated upper end of a vertically disposed arm 68, the same being provided with an inclined face 69, which is adapted to bear against collar 67 when said arm is elevated, thus drawing the rod 64 rearwardly through sleeve 53. Fixed to this arm 68 is a flat spring 70, the same bearing against the rear end of rod 64 and tending to hold the same at its forward limit of movement.

The lower end of arm 68 carries an anti-friction roller 71, the same bearing on a plate 72 which is formed on one end of a lever 73. This lever occupies a transverse position on top of the bed plate immediately adjacent to the offset 11 and its outer end is pivotally connected to a suitable bracket on said bed plate.

An arm 74 depends from arm 73, the lower end of said arm carrying an anti-friction roller which bears on the edge of an eccentric disk 75, the latter being fixed on shaft 14. (See Fig. 2.)

Formed through the central portion of block 42 is an opening 76 and formed in the front and rear faces of said block are recesses 77 and 78 respectively. Arranged for rotary and sliding movement through block 42 and passing through the opening 76 and recesses 77 and 78 is a shaft 79, and positioned thereupon within opening 76 is a pinion 80. This pinion is splined on shaft 79 so as to rotate therewith and said shaft can slide freely lengthwise through said pinion. Meshing with the teeth of this pinion are the teeth of a transversely disposed rack-bar 81, the same occupying the lower portion of opening 76, and one end of this rack-bar is pivotally connected to the upper end of an arm or lever 82, the lower end thereof being loosely mounted on shaft 13. This arm carries a roller 83 which engages in the eccentric groove 84 of a cam plate 85, the latter being fixed on shaft 14. (See Fig. 10.)

Fixed on the rear end of shaft 79 is a collar 86 and bearing against said collar and positioned in recess 78 is a compression spring 87.

Arranged for sliding movement in a suitable bracket on the rear side of block 42 is a transversely disposed bar 88 which is provided with an upwardly projecting lug 89 having a beveled inner face which is adapted to engage the rear end of shaft 79. The outer end of this bar 88 is adapted to be engaged by arm 49 when the same is moved inward, and thus said bar will be moved inward and the inclined face of said lug 89 will bear against the rear end of shaft 79 to force the same forward against the pressure of spring 87. Bar 88 is retracted after being thus moved inward by a retractile spring 90, the same being connected to a part of said bar and to the block 42.

Fixed on the forward portion of shaft 79 is a comparatively short crank arm 92 and seated in the outer end thereof and projecting forwardly parallel with the shaft 79 is a forming finger 91. This crank arm and forming finger are normally positioned within recess 77 as illustrated by solid lines, in Fig. 3.

Positioned on top of the bed plate immediately in front or to the left of fixed block 42 is a block $42^a$ which is practically a duplicate of block 42; and formed on the lower portion of said block $42^a$ are laterally projecting flanges 93, the same being arranged for sliding movement beneath retaining plates 94, the latter being fixed to bed plate 10.

Formed through the bed plate 10 in front of block 42 and below block $42^a$ is an opening 95 through which the cable rings or hangers discharge after being formed by the mandrels or forming heads. Sliding block $42^a$ is equipped with forming devices which are identically the same in construction as the forming devices carried by block 42.

Sleeve $43^a$ in sliding block $42^a$ which corresponds to sleeve 43 in fixed block 42 is disposed so that plate $44^a$ and flange $45^a$ occupy angular positions with respect to the position occupied by corresponding plate 44 and flange 45. Likewise, sleeve $53^a$ which is a counterpart of sleeve 53 is disposed so that forming pin $62^a$ occupies an angular position with respect to corresponding forming pin or finger 62.

Sleeves $43^a$ and $53^a$ are provided respectively with pinions $46^a$ and $54^a$, the latter being engaged by the teeth of transversely disposed rack-bars $47^a$ and $55^a$ respectively. Shaft $79^a$ in sliding block $42^a$ corresponds to shaft 79 in block 42, said shaft $79^a$ carrying a pinion $80^a$, the latter being engaged by the teeth of a transversely disposed rack-bar $81^a$. The outer end of rack-bar $55^a$ is provided with an inverted U-shaped bearing 96 in which normally engages a spherical head 97, the same being formed on the upper end of an arm 98, the lower end thereof being loosely mounted on shaft 13.

Carried by the arm 98 is a roller 99 which engages in an eccentric groove 100 formed in a cam disk 101, the latter being fixed on shaft 14. The outer end of rack-bar $47^a$ is provided with an inverted U-shaped bearing 102 in which normally engages the spherical head 103 of an arm or lever 104, the lower end of which is loosely mounted on shaft 13. Carried by arm 104 is a roller 105 which engages in an eccentric groove 106, the latter being formed in a cam plate 107 which is fixed on shaft 14.

The outer end of rack-bar $81^a$ is provided with an inverted U-shaped bearing 108 which receives a spherical member 109 which is formed on the upper end of an arm or lever 110, the lower end thereof being loosely mounted on shaft 13. Arm 110 carries a roller 111 which engages in an eccentric groove 112, the same being formed in the face of a cam plate 113 that is fixed on shaft 14. Shaft $64^a$ in block $42^a$, and which corresponds to shaft 64 in block 42, is adapted to be drawn outward by a vertically moving member $68^a$ which corresponds to member 68 and the anti-friction roller $71^a$ carried by the lower end of member $68^a$ is adapted to ride on an elongated plate $72^a$, the same being carried by a lever $73^a$ which corresponds to the lever 73.

Plate $72^a$ is necessarily elongated in order to support roller $71^a$ and member $68^a$ when block $42^a$ is moved away from block 42 and which action occurs when the forming heads or mandrels are spread apart to permit the completed ring or hanger to be discharged.

Shaft $79^a$ carries a forming finger $92^a$, the same corresponding to forming pin or finger 92, and said shaft $79^a$ is adapted to be moved forward or toward corresponding shaft 79 by an inclined lug $89^a$ on a bar $88^a$, which latter is engaged by arm 104 when the latter moves forward to impart rotary movement to sleeve $43^a$ through rack-bar $47^a$ and pinion $46^a$.

Depending from block $42^a$ is a bracket 114 to which is pivotally connected one end of a pitman 115, the opposite end thereof carrying a roller 116 which operates in an eccentric groove 117, the latter being formed in a cam plate 118 which is fixed on transverse shaft 32.

The operation of my improved cable ring forming machine is as follows:

The rotary motion of shaft 17 is transmitted through gear wheels 18 and 15 to shaft 14, and from the latter rotary motion is transmitted through beveled pinions 35 and 33 to transverse shaft 32. As the latter is rotated, crank arm 34 reciprocates pitman 30, thereby imparting rocking movement to shaft 27.

The teeth of quadrant 28, which latter is carried by shaft 27, engage the teeth of rack-bar 21 and move the latter backward and forward over the right-hand portion of the bed plate 10. When this rack-bar is at its limit of movement toward the right hand, pawl 25 will by gravity swing into a substantially vertical position and the teeth on the upper end of said pawl will engage the underside of the wire A from which the rings are formed, and grip said wire against lug 24 with the result that the wire is fed forward or toward the forming mandrel with the succeeding movement of the rack-bar toward the left hand.

It will be understood that during the movement of the rack-bar and parts carried thereby toward the right hand, the end of the section of wire A occupies the aperture 41 in post 36, and with the feeding movement of the rack-bar and wire-gripping means toward the left hand, a section of wire of predetermined length will be fed forward through the aperture 41, said wire lying immediately above blocks 42 and $42^a$ and between the projecting ends of the forming pins or fingers 62 and $62^a$. (See Figs. 2 and 4.)

As the rack-bar reaches its limit of forward movement, the end of pin $36^a$ strikes against the lower portion of pawl 25, thereby swinging said pawl so as to release the wire and at the same time, the roller 40 rides upward over the inclined face $22^a$ on the forward end of the rack-bar, thereby elevating plate 39, with the result that the sharpened upper edge of said plate severs the wire at a point within post 36. At this point in the operation, arms 56 and 98 are actuated due to the movement of rollers 57 and 99 in the grooves 58 and 100 respectively, with the result that rack-bars 55 and $55^a$ are moved laterally, thereby imparting rotary movement to pinions 54 and $54^a$, and consequently partially rotating sleeves 53 and $53^a$.

It will be understood that these sleeves move in opposite directions, and consequently the forming pins 62 and $62^a$ will be moved from their normal angular positions past a vertical line into angular positions substantially as illustrated in Fig. 5, and the central portion of the wire, or that portion adjacent to the forming pins or fingers, will be bent into substantially S-shape, it being understood that said wire occupies the grooves 63 and $63^a$ in said pins or fingers.

Immediately succeeding this operation, arms 49 and 104 will be actuated owing to the movement of the rollers 50 and 105 in the grooves 51 and 106, respectively, and as a result rack-bars 47 and $47^a$ will be simultaneously actuated, thereby imparting rotary movement to sleeves 43 and $43^a$.

The end portions of the section of wire of which the cable ring is being formed lie immediately against the edges of plates 44 and $44^a$, and as sleeves 43 and $43^a$ are rotated as just described, said plates, together with the flanges 45 and $45^a$, will engage the projecting portions of the wire and bend the same first laterally and thence downwardly around the heads 60 and $60^a$, it being understood that the S-shaped central portion of said section of wire is still engaged in the grooves 63 and $63^a$ of the forming pins 62 and $62^a$. Thus the end portions of the section of wire occupy substantially vertical positions on opposite sides of the heads 60 and $60^a$ and immediately adjacent the inner faces of blocks 42 and $42^a$.

Just prior to the time the arms 49 and 104 reach their inward limit of movement, said arms will engage the outer ends of bars 88 and 88ª, with the result that said bars will be forced inward and the beveled faces on the lugs 89 and 89ª of said bars will bear against the rear ends of shafts 79 and 79ª, thereby forcing said shafts toward each other, with the result that the pins 92 and 92ª will be moved out of the recesses in which they are normally positioned, said pins lying immediately alongside the vertically disposed portions of the section of wire which depend from the heads 60 and 60ª.

Immediately following this operation, arms 82 and 110 will be actuated, owing to the engagement of the rollers 83 and 111 in the grooves 84 and 112 respectively, with the result that rack-bars 81 and 81ª will be moved through the blocks 42 and 42ª, thereby imparting rotary movement to the pinions 80 and 80ª, and the shafts 79 and 79ª. As the latter are thus rotated, the pins 92 and 92ª will engage the depending portions of the section of wire and bend the same partially around the projecting ends of shafts 79 and 79ª to form hooks B, and these operations complete the forming of the ring or hanger.

Immediately following the forming operation, block 42ª will start to move away from block 42 by virtue of the movement of roller 116 in groove 117 which movement actuates pitman 115 that is connected to block 42ª, and simultaneous with this movement, the arms 49, 56, 82, 98, 104, and 110 will return to their normal positions, thereby causing the various parts of the mandrels or forming heads to return to their normal positions, and as the beveled faces on lugs 89 and 89ª move away from the ends of shafts 79 and 79ª, said shafts will return to their normal positions under the influence of springs 87, with the result that the forming pins 92 and 92ª will be withdrawn from the hooks on the ends of the ring which has just been formed, and said pins will pass into the recesses 77 in the adjacent faces of blocks 42 and 42ª.

Simultaneous with this movement, eccentrics 75 and 75ª will elevate levers 73 and 73ª, thereby elevating upright bars 68 and 68ª, with the result that the inclined faces 69 and 69ª on said bars bear against the collars 67 and 67ª on the outer ends of shafts 64 and 64ª, thereby moving said shafts apart, and as the wedge-shaped lugs 65 and 65ª are withdrawn from the openings in forming pins or fingers 62 and 62ª, the latter will be drawn downward into the heads 60 and 60ª with the result that the central portion of the ring which has been formed will be released, and as soon as block 42ª has moved a sufficient distance away from block 42, the formed ring will drop downward between said blocks and discharge through opening 95 into a suitable receptacle positioned beneath the machine.

During the time the forming operations are being performed, the rack-bar 21 is being moved toward the right hand in order that the teeth on the end of pawl 25 may reëngage the wire at the proper distance so that on the succeeding forward feeding movement, a section of wire of proper length will be moved through the opening 41 into position above the forming heads or mandrels.

The block 42ª does not begin to move toward the left hand or away from block 42 to permit the completed ring to discharge until the arms 98, 104, and 110 have returned to their normal positions, and when said blocks 42ª move away from the blocks 42, the inverted U-shaped bearings 96, 102 and 108 will move away and become disengaged from the spherical heads 97, 103 and 109 on the upper ends of said arms and upon the return of the sliding block 42ª to its normal position, the spherical heads on said arms will reëngage in their respective inverted U-shaped bearings.

During this movement of block 42ª, roller 71ª on the lower end of upright 68ª travels on the elongated plate 72ª which is fixed to lever 73ª.

A cable ring forming machine of my improved construction is comparatively simple, can be economically operated, is entirely automatic in all its operations, and said machine has a comparatively large capacity by reason of the fact that it can be operated at a comparative high rate of speed.

It will be readily understood that minor changes in the size, form and construction of the various parts of my improved cable ring forming machine can be made and substituted for those herein shown and described, without departing from the spirit of my invention, the scope of which is set forth in the appended claims.

I claim:

1. In a machine of the class described, a pair of forming heads each comprising a pair of revoluble members, a wire engaging member carried by and movable radially with respect to one of said revoluble members, and a coöperating forming member rigidly fixed to the other revoluble member.

2. In a machine of the class described, a pair of forming heads each comprising a pair of revoluble members, a wire engaging member carried by and movable radially with respect to one of said revoluble members, a coöperating forming member rigidly fixed to the other revoluble member, and means for feeding a section of wire into position between the radially movable members and the fixed forming members.

3. In a machine of the class described, a pair of forming heads each comprising a pair of revoluble members, a wire engaging member carried by and movable radially with respect to one of said revoluble members, a coöperating forming member rigidly fixed to the other revoluble member, and means for moving one of said heads toward and away from the other.

4. In a machine of the class described, a pair of forming heads each comprising a pair of revoluble members, a wire engaging member carried by and movable radially with respect to one of said revoluble members, a coöperating forming member rigidly fixed to the other revoluble member, means for feeding a section of wire into position between the radially movable members and the fixed forming members, and means for moving one of said heads toward and away from the other.

5. In a machine of the class described, a pair of forming heads each comprising a pair of revoluble members, a wire engaging member carried by and movable radially with respect to one of said revoluble members, a coöperating forming member rigidly fixed to the other revoluble member, and means for simultaneously moving the revoluble members in opposite directions.

6. In a cable ring forming machine, a pair of forming heads each of which includes a revoluble member, a forming pin movable diametrically with respect to said revoluble member, a wire-engaging member movable circumferentially with respect to said revoluble member, means for imparting rotary movement to said revoluble member, and means for imparting rotary movement to the wire-engaging member.

7. In a cable ring forming machine, a pair of forming heads each of which includes a revoluble member, a forming pin movable diametrically with respect to said revoluble member, a wire-engaging member movable circumferentially with respect to said revoluble member, means for imparting rotary movement to said revoluble member, means for imparting rotary movement to the wire-engaging member, and means for moving the pin through the revoluble member.

8. In a cable ring forming machine, a pair of forming heads each comprising a revoluble member, a wire-engaging pin movable diametrically with respect to said revoluble member, a wire-engaging member movable circumferentially with respect to said revoluble member, and means for simultaneously moving the revoluble members of the two heads in opposite directions.

9. In a cable ring forming machine, a pair of forming heads each comprising a revoluble member, a wire-engaging pin movable diametrically with respect to said revoluble member, a wire-engaging member movable circumferentially with respect to said revoluble member, means for simultaneously moving the revoluble members of the two heads in opposite directions, and means for moving one of said heads away from the other to permit the discharge of the formed cable ring.

10. In a cable ring forming machine, a pair of forming heads, means for feeding sections of wire of predetermined length to said heads, a revoluble member forming a part of each head, pins carried by said revoluble members for engaging the central portion of each section of wire, means for bending the section of wire in opposite directions around the pins, means for bending the ends of the section of wire to form hooks, and means for moving one of the heads away from the other to permit the discharge of the completed ring.

11. In a cable ring forming machine, a block, a revoluble member arranged for rotation in said block, a pin arranged for movement in said revoluble member substantially at right angles to its axis, means passing through the revoluble member for moving said pin, and a wire engaging member adapted to move partially around said revoluble member and having the same axis.

12. In a machine of the class described, a pair of forming heads one of which is movable toward and away from the other, means for feeding a section of wire into position adjacent to said heads, means on said heads for engaging the central portion of the section of wire and bending the end portions of said wire partially around said heads, and means for engaging the ends of the section of wire and bending the same to form oppositely disposed hooks.

13. In a machine of the class described, a pair of forming heads one of which is movable toward and away from the other, means for feeding a section of wire into position adjacent to said heads, means on said heads for engaging the central portion of the section of wire and bending the end portions of said wire partially around said heads, means for engaging the ends of the section of wire and bending the same to form oppositely disposed hooks, and means for effecting a withdrawal of the last-mentioned bending means after the hooks have been formed.

14. In a cable ring forming machine, a revoluble member, a pin movable diametrically therethrough, said pin being provided with a wire-receiving groove near one end, means for drawing said pin into the revoluble member, wire-engaging means located adjacent to said revoluble member and movable circumferentially with respect thereto, and means for simultaneously moving the revoluble member and pin in one direction and the wire-engaging member in the opposite direction.

15. In a cable ring forming machine, a pair of blocks one of which is movable with respect to the other, means for reciprocating the movable block, a revoluble member journaled in each block, a wire-engaging pin movable diametrically through each revoluble member, a wire-engaging member movable circumferentially with respect to each revoluble member, means for feeding a section of wire into position adjacent to said revoluble members, means for rotating said revoluble members in opposite directions, means for moving the wire-engaging members in opposite directions to bend the end portions of the section of wire partially around the revoluble members, and means in the blocks for engaging the end portions of the section of wire and bending the same to form hooks.

16. In a machine of the class described, a pair of forming heads, each of which includes a pair of members revoluble in opposite directions, and wire engaging means carried by each member.

17. In a machine of the class described, a pair of forming heads, each of which includes a pair of members revoluble in opposite directions, a wire engaging member rigidly fixed to one of said revoluble members, and a radially movable wire engaging member carried by the other revoluble member.

18. In a machine of the class described, a pair of forming heads, each of which includes a pair of members revoluble in opposite directions, wire engaging means carried by each member, means for feeding a section of wire into position to be engaged by the wire engaging members on said heads, and means adjacent to said heads for engaging and bending the end portions of said section of wire after the same has been bent by the forming heads.

19. In a machine of the class described, a pair of forming heads, each of which includes a pair of members revoluble in opposite directions, a wire engaging member rigidly fixed to one of said revoluble members, a radially movable wire engaging member carried by the other revoluble member, means for feeding a section of wire into position to be engaged by the wire engaging members on said heads, and means adjacent to said heads for engaging and bending the end portions of said section of wire after the same has been bent by the forming heads.

20. In a machine of the class described, a pair of forming heads, means for feeding a section of wire into position adjacent to said heads, means on said heads for engaging said wire and bending it partially around said heads, means for engaging the ends of the section of wire and bending the same to form hooks, and means for moving one of the forming heads away from the other to permit the discharge of the bent section of wire.

In testimony whereof I hereunto affix my signature in the presence of two witnesses, this 23d day of September, 1916.

JOHN W. FORD.

Witnesses:
M. P. SMITH,
M. A. HANDEL.

Copies of this patent may be obtained for five cents each, by addressing the "Commissioner of Patents, Washington, D. C."